Jan. 11, 1938.  D. D. HOEFLER  2,104,990
DISPENSER
Filed Dec. 31, 1935
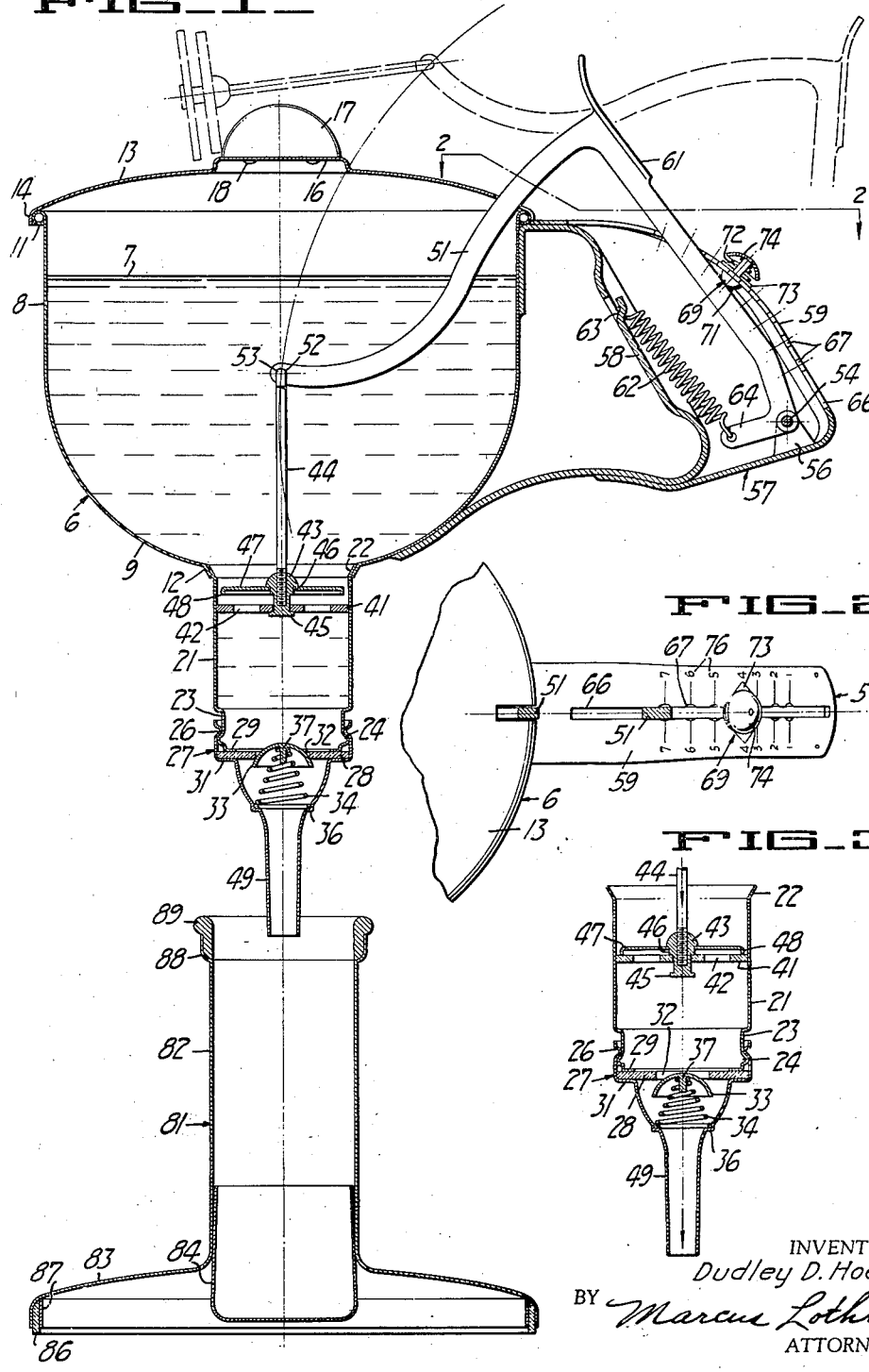
INVENTOR.
Dudley D. Hoefler
BY Marcus Lothrop
ATTORNEY.

Patented Jan. 11, 1938

2,104,990

UNITED STATES PATENT OFFICE 2,104,990

DISPENSER

Dudley D. Hoefler, San Leandro, Calif.

Application December 31, 1935, Serial No. 56,929

3 Claims. (Cl. 221—78)

My invention relates to means for dispensing fluids in relatively small quantities and is particularly concerned with means for dispensing cream, syrup, pastes and like liquids in restaurants and similar establishments where a large number of individual portions of such liquids are utilized.

An object of my invention is to provide means for dispensing a measured amount of liquid.

Another object of my invention is to provide a liquid dispenser which the operator can carry and operate with one hand.

A further object of my invention is to provide a liquid dispenser which is maintained in a protected, sanitary condition and is readily dismantled for sterilizing and cleaning.

Another object of my invention is to provide a dispenser which is readily manufactured in quantities.

An additional object of my invention is to provide a dispenser from which different measured quantities can be dispensed.

A still further object of my invention is in general to improve dispensing mechanisms.

The foregoing and other objects are attained in the embodiment of the invention illustrated in the drawing in which—

Fig. 1 is a cross-section, on a vertical axial plane, of a dispenser constructed in accordance with my invention.

Fig. 2 is a plan of the handle portion of my dispenser the planes of the plan being indicated by the line 2—2 of Fig. 1.

Fig. 3 is a cross-section similar to Fig. 1 but showing the pump portion of my dispenser in discharging position.

In its preferred form the dispenser of my invention comprises a vessel having a handle thereon and being provided with a measuring pump for discharging the contents of the vessel, the measuring pump being actuated by a mechanism which is arranged adjacent the handle for convenient one-hand operation by the operator.

In certain circumstances it is especially desirable to be able to dispense a number of individual portions of liquid, such as cream, paste or syrup, in carefully measured amounts, to the end that while an adequate quantity will be served there will be no excess or waste. Furthermore, it is likewise desirable, when dispensing relatively thick or viscous fluid, such as very heavy cream or especially syrup, to discharge such liquid from the container under considerable pressure in order that the dispensing operation for each individual, measured quantity will be expedited.

I have therefore, in accordance with my invention, provided a dispenser incorporating a vessel 6 which is the container for a liquid 7, such as cream or syrup for instance, and in contour is in its upper part 8 generally circular cylindrical and in its lower part 9 hemispherical. Preferably, the vessel is constructed of relatively light sheet metal rolled over to provide a bead 11 around its upper circular periphery, and adjacent its lowermost portion is finished to provide a central circular aperture with a surrounding conical flange 12. A cover 13, likewise made of sheet metal, has a downturned flange 14 for frictionally engaging the bead 11 and protecting the contents of the vessel, and is centrally embossed to provide a support 16 for a handle 17 preferably formed in the shape of a half-disc and secured in place by fastenings 18.

Depending from the vessel 6 is a pump barrel 21 the upper end of which is provided with a conical flange 22 suitably united to the flange 12 so that the pump barrel 21 merges with the vessel wall 9. The lower end 23 of the pump barrel 21 is preferably reduced somewhat in diameter and is formed to provide projections 24 interengaging with similar projections 26 on a discharge spout 27 to provide a bayonet connection between the discharge spout and the pump barrel.

Interposed between the pump barrel 21 and the discharge spout 27 is a discharge valve disc 28, preferably of rubber or comparable material, which is clamped in place between an inturned terminal flange 29 on the pump barrel and an annular ledge 31 formed in the discharge spout 27. The discharge valve disc 28 is perforated by a central aperture 32, adapted to be closed by a discharge valve 33 seating on the disc 28. The valve 33 is preferably a hemispherical dome in order to be self-aligning, and is urged into position by a conical spring 34 interposed between the valve 33 and a suitable circumferential groove 36 formed in the discharge spout 27. Preferably, the base of the spring 34 is either soldered in position or is frictionally held in place, while the upper end of the spring is secured around a central stem 37 of the discharge valve by solder or comparable material.

The discharge valve 33 is ordinarily urged into closed position and prevents egress of liquid from the vessel or reservoir 6, but in order to measure a predetermined amount of liquid to be dispensed and in order to discharge such liquid under pressure, I preferably provide in the pump barrel 21 a piston 41. This piston is preferably a relatively stiff disc of rubber or comparable material which frictionally engages the wall of the barrel 21 and is pierced by a plurality of apertures 42 affording communication between the interior of the vessel 6 and the interior of the pump barrel 21. Engaging the piston 41 with a lost motion connection is a boss 43 screwed onto the terminus of a piston rod 44 reciprocable in the pump barrel 21 and extending into the vessel 6. The lower end of the boss 43 is provided with an enlarged head 45 to retain the piston 41 in position, and is provided with an enlargement 46 to limit the extent of axial lost motion of the piston on the boss.

Mounted on the boss, and adapted, in one relative position of the piston 41 with respect to the piston rod 44, to overlie the apertures 42, is a valve disc 47 which preferably is made of metal and tightly engages the hub 46. The periphery of the valve disc is downturned to provide a sealing flange 48. When the piston rod 44 is raised, the piston 41 engages frictionally the walls of the pump barrel 21 until such time as the flange 45 abuts the disc 41. When this occurs, the valve disc 47 is spaced apart from the piston 41 and, since the diameter of the disc 47 is considerably less than that of the pump barrel 21, liquid from the vessel 6 flows around the edges of the disc 47, through the apertures 42, and into the pump barrel 21, thereby charging this space with liquid. During this time the discharge valve 32 is maintained closed by the spring 34.

When the piston rod 44 subsequently descends, the first movement thereof is ineffective upon the piston 41 which is held frictionally in position due to its engagement with the walls of the pump barrel 21. This first movement, however, does move the valve disc 47 into abutment with the piston 41, thereby overlying and closing off the apertures 42. Further descending movement of the piston rod 44 translates the piston 41 bodily in the pump barrel 21 and, since the apertures 42 are closed, raises the pressure within the pump barrel, thereby opening the discharge valve 33 against the urgency of the spring 34 and by force discharging the liquid within the barrel 21 through the discharge spout 49.

In order to impart the described motion to the piston rod 44, I preferably actuate the piston rod by means of a lever 51 at one end provided with an aperture 52 through which a hooked portion 53 of the piston rod 44 passes. The lever 51 at its other end is mounted on a pivot pin 54 carried between a pair of ears 56 struck up from the material of a handle 57 extending to and fastened to the vessel 6. The handle is preferably made of an inner curved strip 58 and an outer curved strip 59, between which the lever 51 extends, and is designed to afford a convenient hand-grip for the operator. The lever 51 is so shaped that a thumb-plate 61 is conveniently provided in a suitable location so that the same hand of the operator which grasps the handle 57 can readily actuate the lever 51 to operate the measuring pump. A coil spring 62 at one end is hooked over an ear 63 struck up from the strip 58 and at the other end is in engagement with an extension 64 of the lever 51 and normally urges the lever into the position shown in Fig. 1 in which the pump barrel 21 is charged or filled gravitationally with fluid 7 from the vessel 6.

Since the pump is a displacement pump, the volume swept through on a single stroke by the piston 41 is an accurate measuring device for a volume of liquid to be dispensed. I therefore provide means for varying at will the stroke of the piston in order that various predetermined quantities of liquid will be dispensed at each stroke. For this reason the outer strip 59 of the handle 57 is slit by a central slot 66 through which the lever 51 operates. At suitably spaced intervals the slot is enlarged to provide in effect circular apertures 67 within which seats an enlarged hub of a stop member, generally designated 69. A head 71 on the stop member rides against the inside of the strip 59 and is abutted by the lever 51 in its uppermost position. A spring 72 is interposed between an index plate 73 extending across the strip 59 and having a central depressed rib sliding in the slot 66, and abuts a button 74 acting as the terminus of the stop member. Preferably, the index co-operates with suitable legends or indicia 76 on the strip 59. When the stop member 69 is in the uppermost aperture 67, the stroke of the lever 51 is limited in its upward travel so that it is considerably shorter than maximum. When the stop member is moved into a lower aperture 67, the permissible stroke of the lever 51 is progressively increased, so that there is provided an adjustable means of regulating the predetermined quantity to be dispensed.

I preferably extend the slot 66 to such a point that the stop 69 can be moved into a lowermost position adjacent the pivot pin 54, in which position the lever 51 can be rotated sufficiently that the piston 41, the piston rod 44 and the disc 47 can be withdrawn from the pump barrel 21. When the cover 13 is removed, the piston rod 44 and its attached parts can then be rotated about the end of the lever 51, as shown in dotted lines in Fig. 1, and can be entirely unhooked and removed for cleaning purposes. The interior of the dispenser is therefore accessible for cleaning brushes, sterilizing materials, and similar agencies. This arrangement likewise facilitates assembly of the device originally and after cleaning. Since the flange 14 of the cover is notched to overlie the outer strip 59 with a snug fit, the cover 13 is accurately held in place so that the lever 51 can pass through a marginal notch therein freely, without binding but with a small enough clearance to exclude foreign matter.

In addition to the vessel 6 and its appurtenant mechanisms, I provide a stand which is co-operative with the dispenser in that it protects the discharge nozzle 49 when the device is not in use. Preferably there is provided a cup 81 which includes a cylindrical extension 82 of a base 83 and a removable plug 84 which frictionally engages the cylindrical walls 81 and forms a virtually airtight contact therewith. A strip 86 of rubber or comparable material contacts a supporting surface and is held in place by an interior spring ring 87. The cylindrical portion 82 is of sufficient extent to accommodate the discharge spout 49 and the pump barrel 21, and adjacent its upper end is outwardly flared, as at 88, to receive a ring 89 of rubber or comparable material which, when the vessel 6 is in operative position with the spout 49 and the barrel 21 contained within the cup 82, abuts the under surface 9 of the vessel 6 and forms virtually an air-tight closure therewith. Since, therefore, the depending part of the dispenser is retained when not in use in virtually an air-tight compartment, it is not accessible to contamination and material leakage is prevented due to the fact that it is virtually impossible to displace the entrapped air from within the cup. Any leakage which does occur, however, is caught by the removable plug 84 which can be emptied by the frictional detachment of the plug from its support.

I claim:

1. A dispenser comprising a vessel, a displacement pump for discharging the contents of said vessel, a slotted handle on said vessel, means passing through the slot in said handle and engageable by the thumb of an operator grasping said handle for actuating said pump, and means movable in the slot in said handle for varying the effect of said actuating means.

2. A dispenser comprising a pump barrel, a piston frictionally engaging the wall of said barrel, said piston having an aperture therein, a piston rod reciprocable in said barrel and engaging said piston with a lost motion connection, a valve disc on said piston rod adapted to overlie said aperture in one relative position of said piston and said piston rod, a discharge spout engaging said barrel, a discharge valve disc clamped between said barrel and said spout, said discharge valve disc having an aperture therein, a valve adapted to seat on said discharge valve disc to close said aperture, and a spring abutting said valve and said spout for urging said valve toward seating position.

3. A dispenser comprising a vessel, a handle on said vessel, a pump barrel depending from said vessel, a piston and piston rod reciprocable in said barrel, a lever pivotally mounted on said handle, a cover for said vessel having an aperture therein, and a curved extension on said lever arcuate about the pivotal mounting of the lever as a center and passing through said aperture to connect with said piston rod.

DUDLEY D. HOEFLER.